July 20, 1965  E. W. LANGE  3,195,401
FILM PROJECTOR WITH TELESCOPIC CABINET
Filed July 13, 1962  3 Sheets-Sheet 1

INVENTOR.
ELMER WILLIAM LANGE
BY
WILSON, SETTLE & CRAIG
ATTORNEYS

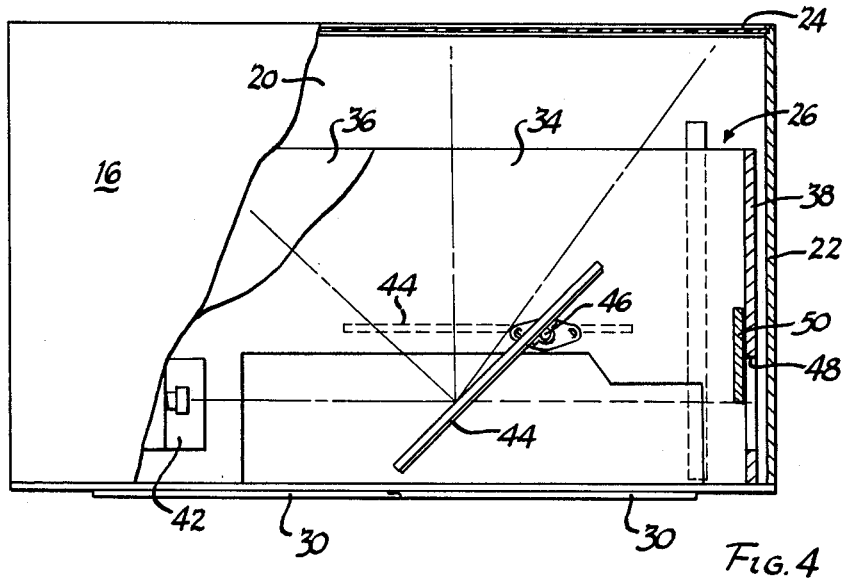
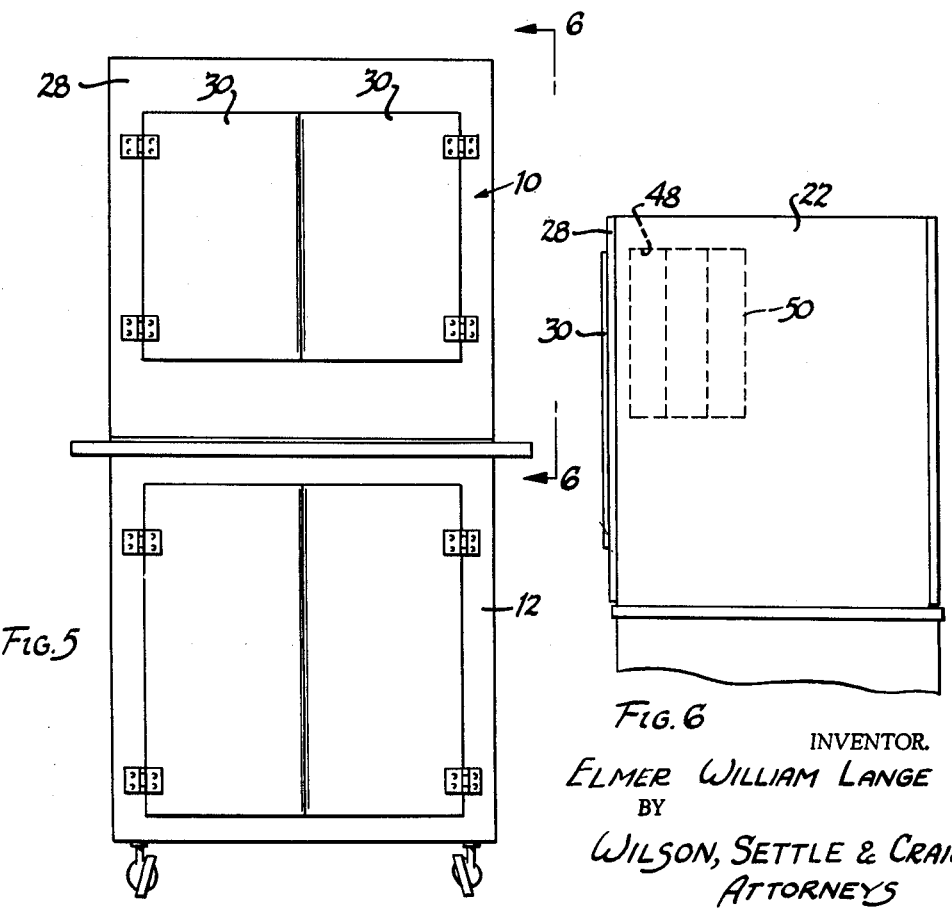

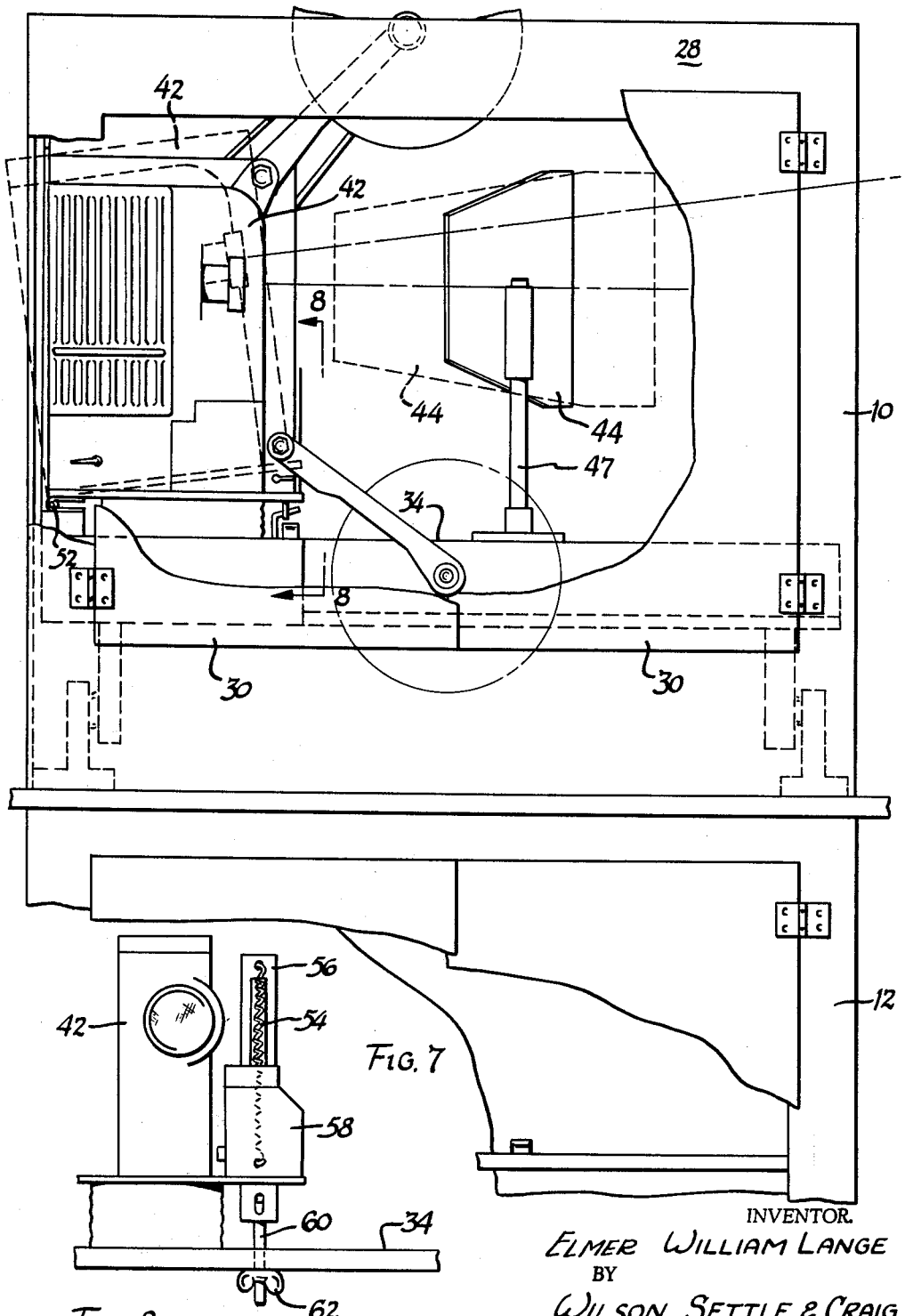

United States Patent Office 3,195,401
Patented July 20, 1965

3,195,401
FILM PROJECTOR WITH TELESCOPIC CABINET
Elmer William Lange, Saginaw, Mich., assignor of fifty percent to Crystal M. Lange, Saginaw, Mich.
Filed July 13, 1962, Ser. No. 209,596
4 Claims. (Cl. 88—24)

This invention relates to a cabinet containing an optical projector for the projection of images from within the cabinet either on a screen forming part of the cabinet or on a surface remote from the cabinet. It has heretofore been proposed to provide various arrangements of cabinets containing viewing screens and optical projectors which can be used both for projecting back images on the light-transmitting screen and for projecting images on a remote screen or wall outside the cabinet. Such devices which have come to my attention, while operable within their inherent limitations, have been inconvenient, bulky, inefficient, or expensive. It is the purpose of this invention to eliminate or importantly reduce these disadvantages.

Therefore, it is among the objects of the invention to provide an improved arrangement of projection cabinet containing an optical projector and translucent screen for projecting images either on this screen or on a reflecting screen or wall remote from the cabinet, and which can be readily changed to project on either screen.

In particular, it is an object of the invention to provide a cabinet including a shell or box, one side of which is formed by a translucent viewing screen and including a second shell or box which is telescopable with respect to the first, and an optical projector supported on the second box which can be moved toward the screen for compact storage and which can be moved away from the screen and when so moved can project a beam of light outside of the cabinet.

It is also an object to provide a drawer or telescoping box carrying the projector which slides inside of an outer box carying the screen, so that the screen can occupy substantially the full area of the cross-section of the outer box or cabinet and inner or sliding supports for the drawer can be disposed within the projected area of the screen. This promotes compactness of the entire assembly.

It is also an object to provided an arrangement of cabinet and drawer or telescoping box in which the light beam is directed transverse to the direction of movement of the drawer so that when the drawer is pulled out the light beam can project on a surface remote from the cabinet and when the drawer is pushed in the projector can be automatically in position to focus precisely on the screen.

It is also an object to provide such an arrangement of cabinet and drawer or inner box in which the projector is placed as close to one side edge of the drawer as possible to provide a long light path to the screen while making the entire assembly compact. This may require that when the drawer is pulled out for remote projection there must be suitable space or openings for tilting the projector so that part of it is outside of the projected area of the screen, a position which it could not occupy when the drawer is closed or pushed in.

Other objects and advantages of the invention will be apparent from the folowing description and the accompanying drawings, in which each reference character, wherever it occurs, always refers to the same part.

In the drawings:

FIGURE 4 is a top plan view of the cabinet with parts of both the outer and inner boxes or shells partly broken away.

FIGURE 5 is a back elevation of the cabinet;

FIGURE 6 is a side elevation of the upper part of the cabinet as seen from the right of FIGURE 4;

FIGURE 7 is an enlarged fragmentary back elevation of the cabinet corresponding to FIGURE 5 but partly broken away to show the projector and associated apparatus; and FIGURE 8 is a reduced fragmentary schematic section on the line 8—8 of FIGURE 7, showing the projector adjusting mechanism.

Before explaining the invention in detail, it is to be understood that the invention is not limited to the particular construction nor arrangement described herein or shown in the accompanying drawings, which are for illustration only, since the invention can be embodied in other forms and can be practised or carried out in various ways. Also it is to be understood that the phraseology or terminology used herein is only for the purpose of description and illustration and does not constitute a limitation of the invention.

Figure 1:
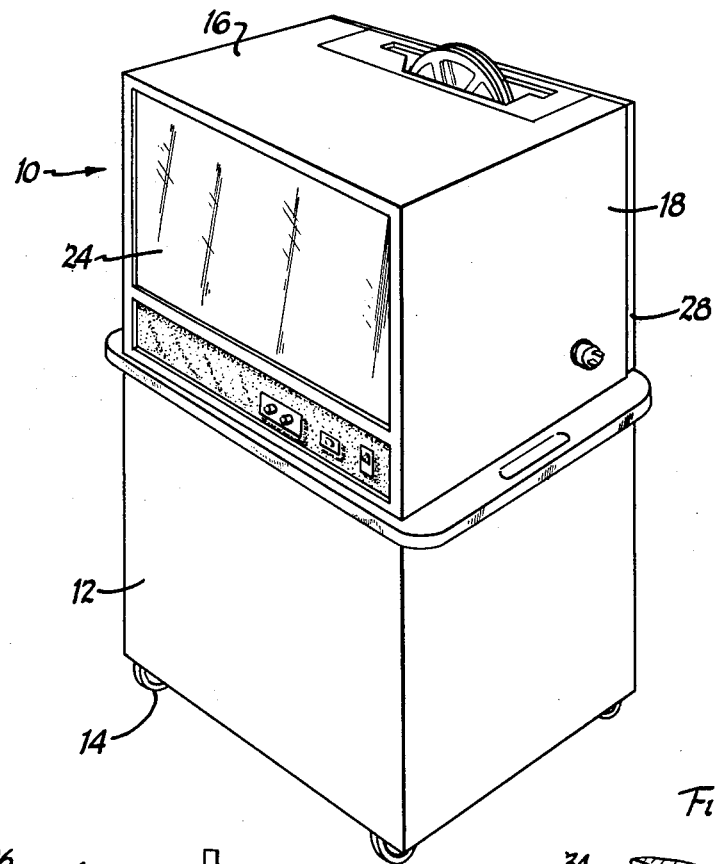
FIGURE 1 is a perspective view of a projection cabinet embodying one form of the invention, shown closed in position for projection on a screen forming part of the cabinet.

Referring to the drawings and particularly to FIGURES 1 and 4, the projection device includes a cabinet generally desgnated by 10, which houses or includes all of the projection mechanism. For convenience this may be mounted on a base or storage cabinet 12 supported on rollers 14.

Figure 2:
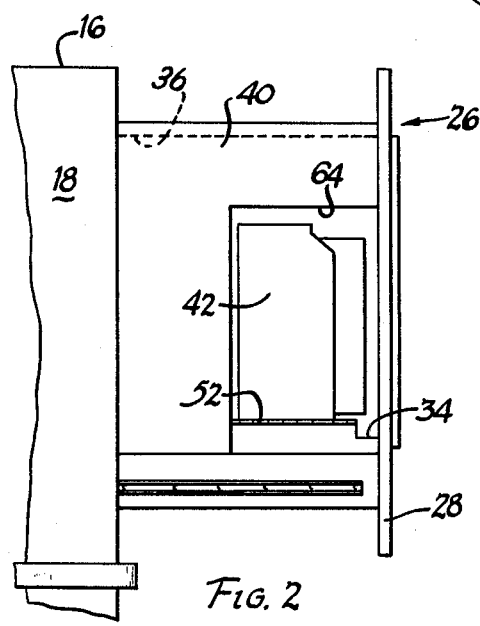
FIGURE 2 is a fragmentary side elevation of the cabinet as seen from the right of FIGURE 1 having the drawer or slide pulled out into the remote projecting position.
Figure 3:
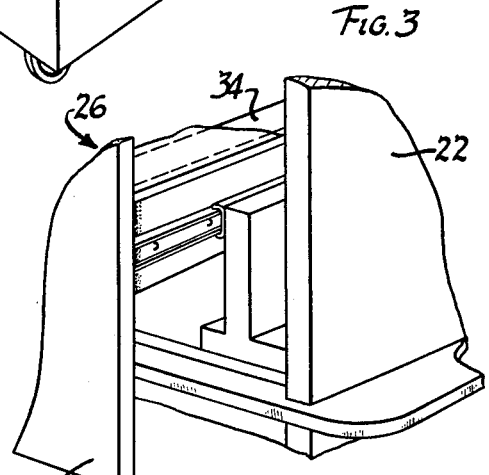
FIGURE 3 is a fragmentary perspective view of a portion of the cabinet and drawer support as seen from the left of FIGURE 1 showing one form of sliding support for the drawer.

The projection cabinet has top wall 16, a left side wall 18, bottom wall 20 and a right side wall 22. These walls define a box or shell which supports at its front a translucent or light-transmitting viewing screen 24. The box is open at its back end as shown in FIGURE 3. A drawer or inner box, generally designated by 26, in FIGURES 2 and 3 particularly, includes a wall 28 which closes the open back of the cabinet 10 when the drawer is pushed in. In saying that the drawer closes the opening, I mean that is prevents the transmittal of any substantial quantity of light from the projector through the back opening of the cabinet 10 and so avoids stray light which might be reflected from the inside of the projection cabinet and be objectionable to persons viewing the screen 24. Preferably the wall 28 is imperforate as far as light transmission is concerned, and this imperforate form of construction may include a pair of doors 30 which may be opened for adjustment of the apparatus, but which when closed prevent the transmittal of light through the wall 28.

The drawer is supported in any suitable manner inside the cabinet 10. Essentially the drawer includes a bottom or shelf 34 shown most clearly in FIGURES 2, 4 and 8, rigidly secured to the drawer front or wall 28. Preferably the drawer may also include a top wall 36, indicated in dotted lines in FIGURE 2 and shown in plan in FIGURE 4. The drawer has a right side wall 38 shown in FIGURE 4 and a left side wall 40 shown in elevation in FIGURE 2. The top wall may have an opening 37 for the upper reel of an optical projector, as will be explained, and as is shown in FIGURE 7.

When so provided with top and side walls the drawer in effect constitutes a box which telescopes with respect to the box or cabinet 10. Such box may be inside or outside of the walls 16, 18, 20 and 22, but is preferably inside of these walls because this enables me to make a more compact outer cabinet since the walls 36, 38 and 40 can be disposed within the projected area of the screen 24 which screen can thus occupy substantially the entire cross-section of the cabinet 10.

The drawer 26 supports any suitable optical projector 42 which may be supported on the drawer bottom 34 and thus is supported by or attached to the front wall 28 of the drawer and moves with the front wall. Preferably the projector is placed as far to the left of the wall 28 as is possible, for compactness, as will be explained, and the projector has its beam directed toward the side of the cabinet, i.e. perpendicular to the direction of motion of the drawer. The bottom 34 may have an opening 43 to receive the lower reel of the projector shown in FIGURE 7, and because of this the bottom 34 of the drawer is placed a sufficient distance above the bottom 20 of the cabinet 10. A mirror 44 is pivoted on a vertical spindle 46 which may be supported on the drawer as shown in FIGURE 7. When the mirror is turned to the full line position shown in FIGURES 4 and 7, it reflects the beam from the projector onto the viewing screen.

The improved cabinet can be used in either of two ways for interval projection on the screen. If the depth of the cabinet from front to back and the focal length of the projector are properly designed, the projector can focus an image precisely on the screen with the drawer pushed in. However, I prefer to project on the screen with the drawer pulled out in order to provide a long light path and large image filling the entire screen. The projector is placed as far to the left of the cabinet as possible to give the greatest length of optical path to the screen for a convenient depth of cabinet. When the mirror is in the dotted line position shown in FIGURES 4 and 7, the beam of light from the projector passes the mirror. With the mirror in dotted line position, the drawer can be pulled out until the beam passes the edge of the right side wall 22 of the cabinet 10. If the apparatus is designed to be used for projecting on the screen with the drawer pushed in, the right side wall 38 can be omitted.

Pulling out of the drawer opens the back of the cabinet 10 and establishes a light path direct from the projector to a position outside of the cabinet. The device can thus project an image on a reflecting surface which can be placed remote from the cabinet, providing a larger image than can be shown on the screen 24. However, since I prefer to include the side wall 38 and to pull the drawer out even for back projection on the screen, I provide an opening 48 in the side wall 38 through which the image can be projected on a remote wall. This opening is closed by a sliding door 50 when the front screen 24 is used.

When the apparatus is used for remote projection it may be necessary to tilt the projector to elevate its beam. For this purpose the projector is pivoted on a horizontal pivot or hinge 52 secured to the shelf 34 or wall 28 of the drawer. The projector may be constantly urged to rotate counterclockwise as FIGURE 7 is seen by a tension spring 54 stretched between a standard 56 and a member 58 attached to the projector. The projector is held against the spring by a threaded rod 60 attached to the member 58 which passes through the bottom 34 of the drawer and is adjusted by a wing nut 62.

Because the projector is mounted as far to the left of the drawer as possible, the upper corner of the projector must extend beyond the cabinet when it is tilted to elevate the beam as shown by dotted lines in FIGURE 7. Consequently, if side wall 40 is used with the drawer, it is necessary to provide an opening 64 in the side wall 40 through which the projector can be tilted, see FIGURES 2 and 7.

The opening 64 preferably substantially fits the projector, so that the projector blocks stray light behind it when projecting on a remote wall.

I claim:

1. A projection device comprising a cabinet having a top wall and opposed side and end walls, one of said side walls having a light transmitting viewing screen therein, a drawer-like inner box having a bottom wall and opposed end walls mounted for sliding movement in said cabinet toward and away from said one of said side walls between an open projecting position and a closed viewing position, the side wall of said cabinet opposite said one of said side walls being mounted upon said inner box for movement therewith, a projector mounted within said inner box to project a beam parallel to the side wall on said inner box, a mirror mounted in said inner box for movement between a reflecting position wherein said mirror reflects a beam from said projector onto said screen and an inoperative position wherein said mirror is located clear of the path of said beam, and an optical opening in an end wall of said inner box aligned with said projector for passing the beam of said projector from said cabinet when said inner box is in its open projecting position.

2. A projection device as defined in claim 1 wherein said mirror is mounted upon said bottom wall of said inner box for pivotal movement about a vertical axis.

3. A projection device as defined in claim 1 wherein said projector is supported for tilting movement about a horizontal axis adjacent the end wall of said inner box opposite that in which said optical opening is located, said opposite end wall of said inner box having an opening therein for accommodating tilting movement of said projector when said inner box is in said open position.

4. A projection device as defined in claim 1 further comprising a top wall on said inner box for substantially completely enclosing said projector when said inner box is in its open position.

References Cited by the Examiner

UNITED STATES PATENTS 2,342,874   2/44   Links et al. _____ 88—24
2,575,579  11/51   Bullock et al. _____ 88—24 X
2,880,646   4/59   Brothers _____ 88—24

NORTON ANSHER, *Primary Examiner.*

WILLIAM MISIEK, *Examiner.*